(12) United States Patent
Linnell

(10) Patent No.: US 7,830,770 B1
(45) Date of Patent: Nov. 9, 2010

(54) TECHNIQUES FOR STORING AND RETRIEVING DATA USING A SPHERE-SHAPED DATA STORAGE STRUCTURE

(75) Inventor: J. Andrew Linnell, Hudson, MA (US)

(73) Assignee: EMC Corporation, Hopkinton, MA (US)

( * ) Notice: Subject to any disclaimer, the term of this patent is extended or adjusted under 35 U.S.C. 154(b) by 843 days.

(21) Appl. No.: 11/376,355

(22) Filed: Mar. 15, 2006

(51) Int. Cl.
*G11B 7/00* (2006.01)
*G11B 17/04* (2006.01)
*G11B 3/70* (2006.01)
*G11B 23/20* (2006.01)

(52) U.S. Cl. ............. 369/103; 369/109.02; 369/273; 369/292

(58) Field of Classification Search ........... 369/112.1
See application file for complete search history.

(56) References Cited

U.S. PATENT DOCUMENTS

| | | | |
|---|---|---|---|
| 5,506,398 A * | 4/1996 | Naruto | 250/201.5 |
| 5,910,940 A | 6/1999 | Guerra | |
| 5,946,281 A | 8/1999 | Ito et al. | |
| 6,094,413 A | 7/2000 | Guerra | |
| 6,101,009 A * | 8/2000 | Linke et al. | 359/22 |
| 6,825,960 B2 | 11/2004 | Curtis et al. | |
| 7,070,323 B2 * | 7/2006 | Wanek et al. | 374/45 |
| 7,567,494 B2 * | 7/2009 | Shimokawa | 369/103 |
| 2004/0085644 A1 * | 5/2004 | Patton et al. | 359/626 |
| 2006/0062096 A1 * | 3/2006 | Kerr et al. | 369/30.27 |

\* cited by examiner

*Primary Examiner*—Wayne R Young
*Assistant Examiner*—Carl Adams
(74) *Attorney, Agent, or Firm*—BainwoodHuang

(57) ABSTRACT

An optical storage system includes a frame (e.g., a rack-mount drawer), an environmental assembly (e.g., a power and cooling subsystem) supported by the frame, and a set of optical storage devices coupled to the environmental assembly. Each optical storage device has a base, a storage medium (e.g., a sphere-shaped holographic data storage structure) disposed on the base, and an optical assembly coupled to the base. The storage medium has a curved surface configured to store data in a digital manner thereon. The optical assembly is configured to optically write the data to and read the data from the curved surface of the storage medium.

21 Claims, 5 Drawing Sheets

TECHNIQUES FOR STORING AND RETRIEVING DATA USING A SPHERE-SHAPED DATA STORAGE STRUCTURE

BACKGROUND

Conventional holographic video storage equipment includes (i) a laser beam source, (ii) a beam splitter, (iii) a spatial light modulator, and (iv) a flat, transparent, holographic storage disk. To write data to the disk, the laser beam source emits a beam of laser light. The beam splitter separates the laser beam into a signal beam and a reference beam. The spatial light modulator encodes a data pattern within the signal beam but not into the reference beam. The signal beam and the reference beam then intersect each other at a relatively-narrow location of the holographic storage disk. Photosensitive material within the holographic storage disk reacts to the intersection of these beams and, as a result, stores the data pattern three-dimensionally as layered digital pages (i.e., a hologram) at that location.

In contrast to conventional compact disks (CDs) and digital versatile disks (DVDs) which are flat, reflective disks that reflect laser light from a laser source onto an optical reader while the disks are spinning, a flat, transparent, holographic storage disk remains stationary during the writing and reading process. Furthermore, the holographic storage disk is mainly non-reflective so that, during the reading process, light from one side of the holographic storage disk shines on a hologram within the disk (i.e., layered digital pages) and a sensor on the other side of the disk reads the refracted light to re-construct the data pattern.

Since the data pattern is capable of including several digital pages of data, a significant amount of information can be stored on a single holographic storage disk. Some companies have reported the capability of storing 2 Gigabytes (GBs) in an area of a holographic storage disk which is roughly the size of a conventional postage stamp, as well as the ability to read that data at a rate of 20 Megabits per second (Mb/s). An example of a company providing similar reports is InPhase Technologies of Longmont, Colo.

SUMMARY

Unfortunately, there are deficiencies to the above-described conventional holographic storage equipment and disks. For example, due to the flat platter geometry of the conventional holographic storage disk, there is currently a need for complex electromechanical devices to traverse relatively long travel lengths in order to access the various locations of each disk. Although data patterns can be read relatively quickly once an electromechanical device has properly positioned the data access components at a particular data storage location, there are latencies which result from moving the data access components around the disk. Furthermore, such movement can result in a substantial amount of heat build up and wear and tear thus posing a potential source of error or even failure.

In contrast to the above-described conventional holographic storage equipment and disks, improved data storage techniques involve the use of a storage medium having a curved surface (e.g., a holographic storage sphere) and an optical assembly configured to optically write data to and read data from the curved surface of the storage medium. The use of such a storage medium and optical assembly minimizes the need for extensive travel of the optical assembly. Rather, data access operations can be effectuated by simply orienting the optical assembly from a location which is substantially central to an internal space defined by the curved surface of the storage medium. Such orientation can occur with minimal latency and travel (e.g., simple control of angular direction). Accordingly, data access times are optimized, and mechanical movement and the associated heat generation are kept to a minimum.

One embodiment is directed to an optical storage system which includes a frame (e.g., a rack-mount drawer), an environmental assembly (e.g., a power and cooling subsystem) supported by the frame, and a set of optical storage devices coupled to the environmental assembly. Each optical storage device has a base, a storage medium (e.g., a sphere-shaped holographic data storage structure) disposed on the base, and an optical assembly coupled to the base. The storage medium has a curved surface configured to store data in a digital manner thereon. The optical assembly is configured to optically write the data to and read the data from the curved surface of the storage medium.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Improved data storage techniques involve the use of a storage medium having a curved surface (e.g., a holographic storage sphere) and an optical assembly configured to optically write data to and read data from the curved surface of the storage medium. The use of such a storage medium and optical assembly minimizes the need for extensive travel of the optical assembly. Rather, data access operations can be accomplished by simply orienting the optical assembly from a location which is substantially central to an internal space defined by the curved surface of the storage medium. Such orientation can occur with minimal time latency and travel (e.g., simple control of angular direction). Accordingly, data access times are optimized, and mechanical movement and the associated heat generation are kept to a minimum.

Figure 1:
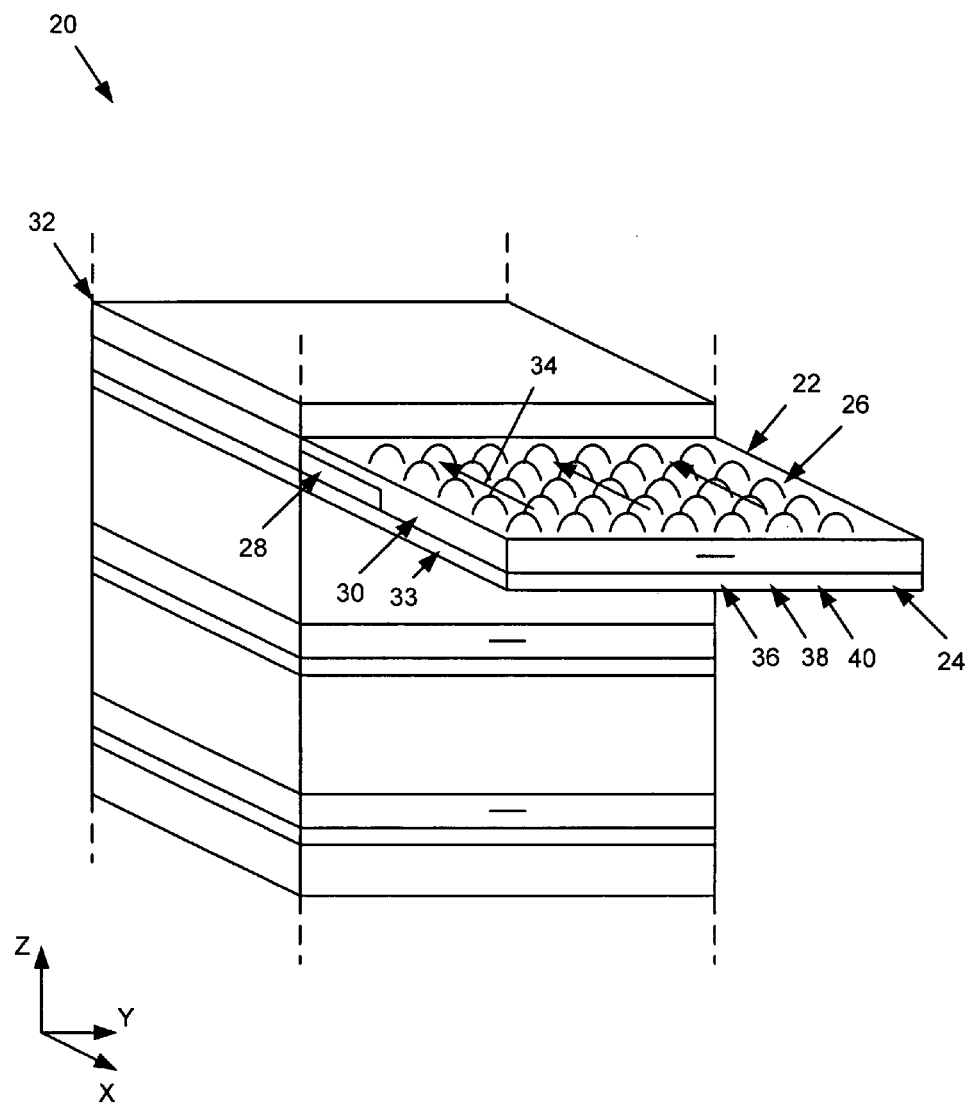
FIG. 1 is a perspective view of an optical storage system which is configured to store data holographically on optical storage devices which employ sphere-shaped structures.

FIG. 1 shows an optical storage system 20 which is configured to store data holographically. The optical storage system 20 includes a frame 22, an environmental assembly 24 and a set of optical storage devices 26 (i.e., one or more optical storage devices 26). The frame 20 is configured to fit within a larger support system (e.g., an equipment rack, an electronic cabinet, etc.). Accordingly, the optical storage system 20 is capable of joining other data storage components (e.g., other optical storage systems, mixed with standard magnetic storage systems, etc.) as part of a larger storage array which is easily scalable.

In the particular arrangement shown in FIG. 1, the frame 22 includes mounting hardware 28 and a drawer 30. The mounting hardware 28 is configured to mount the drawer 30 to vertical rails of an equipment rack 32, and allow a user to conveniently slide the drawer 30 out of the equipment rack 32 (e.g., for upgrading, for servicing, etc.) or slide the drawer 30 back in to the equipment rack 32 in a substantially horizontal manner. The drawer 30 is configured to support both the environmental assembly 24 and the optical storage devices 26. As shown in FIG. 1, drawer 30 is capable of holding the optical storage devices 26 in a high density formation having a two-dimensional layout in the X-Y plane to provide a high memory space to physical space ratio. Accordingly, the optical storage system 20 is particularly well-suited for storage applications dealing with extremely large amounts of data (e.g., archives, libraries, databases, etc.).

The environmental assembly 24 is configured to provide a variety of resources to the set of the optical storage devices 26 including main power 33 (e.g., a set of power supply signals) and an air stream 34 (e.g., a set of fans) to remove heat. By way of example only, the air stream 34 is shown as flowing front to back so that ambient air enters through the front of the drawer 30 and exits through the rear. The environmental assembly 24 is capable of providing other resources as well such as a communications fabric 36 from the optical storage devices 26 to a controller 38, battery backup power 40, and so on.

Each optical storage device 26 is configured to store and retrieve data holographically. Such optical storage devices 26 are capable of replacing magnetic disk drives in a variety of contexts (e.g., in general purpose computers, in RAID arrangements, in data storage systems which perform load and store operations on behalf of external hosts, etc.). Further details will now be provided with reference to FIG. 2.

Figure 2:
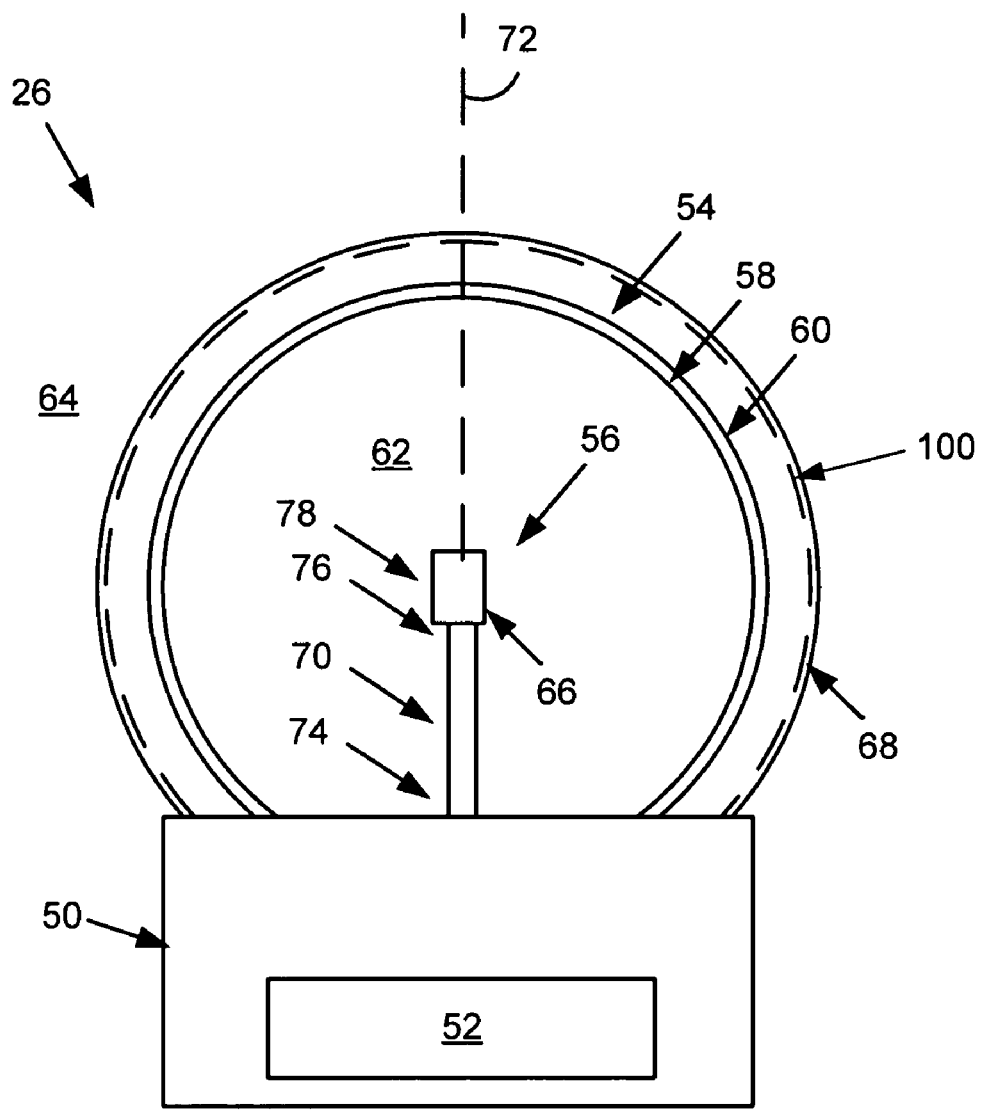
FIG. 2 is a sectional view of an optical storage device which utilizes an actuator mechanism to control data access.

FIG. 2 is a sectional view of an optical storage device 26 in accordance with a first embodiment. The optical storage device 26 includes a base 50 having an interface 52 which is configured to connect to and disconnect from the environmental assembly 24 in a modular manner for hot-swappability (e.g., for quick removal and installation). In some arrangements, the interface 52 includes electrical connectors which connect to power supply terminals to obtain power as well as a communications port to exchange data. In other arrangements, the interface 52 includes electrical connectors which connect to power supply terminals for power, and a wireless transceiver (illustrated generally by the reference number 52 in FIG. 2) for wireless data communications (e.g., data exchange with the controller 38 in FIG. 1).

The optical storage device 26 further includes a storage medium 54 and an optical assembly 56 both of which are disposed on the base 50. The storage medium 54 has a curved surface 58 configured to store data in a digital manner thereon. The optical assembly 56 is configured to optically write the data to and read the data from the curved surface 58 of the storage medium 54.

As shown in FIG. 2, the storage medium 54 includes a sphere-shaped structure 60 which defines an internal space 62 and an external space 64. The BuckyBall-shape of the storage medium allows air to pass around the curved edges for enhanced cooling. The storage medium 54 includes photo-sensitive recording material which is configured to store holographic images as digital data pages. Such materials preferably are transparent, highly photosensitive, thermally stable and adaptable to reliably remain substantially in the shape of a sphere having a size which is between a golf ball and baseball. Examples of similar materials are photopolymers and photonic coatings and materials designated by the mark Tapestry® which is available from InPhase Technologies of Longmont, Colo.

The optical assembly 56 of the optical storage device 26 includes a light source 66 disposed within the internal space 62, a light sensor 68 disposed within the external space 64, and an actuation mechanism 70. The actuation mechanism 70 defines a central axis 72, and has a first end 74 which attaches to the base 50 and a second end 76 disposed at a central location 78 within the internal space 62. The light source 66 attaches to the second end 76 and is safely sheltered from the external space 64. The light source 66 and the light sensor 68 electrically connect to the interface 52 within the base 50 for power and data I/O (e.g., wireless data communications). The actuation mechanism 70 is configured to point the light source 66 toward designated data storage locations on the storage medium 54. The light source 66 is configured to provide light during data writing and data reading operations performed on the curved surface 58 of the storage medium 54. The light sensor 68 is configured to sense light from the light source 66 which passes through the curved surface 58 of the storage medium 54 and thus read data stored within the storage medium 54.

One of ordinary skill in the art will appreciate that the actuation mechanism 70 is capable of relying on a simple angular displacement about the central vertical axis 72 (i.e., azimuth) in combination with a simple angular displacement from horizontal (i.e., altitude). Such operation enables the actuation mechanism 70 to aim the light sensor 68 at a particular data storage location of the storage medium 54 (i.e., a selected curved portion of the sphere-shaped structure 60 among multiple curved portions) based on electronic signals from a controller (e.g., see the controller 38 in FIG. 1). Moreover, a variety of coordinate mapping schemes are suitable for use such as X/Y grid, azimuth/altitude, longitude/latitude, and so on. Accordingly, in contrast to linear actuators of magnetic disk drives which must convey magnetic read and write heads back and forth along a lengthy radial axis of a flat magnetic disk, there is little movement linear movement of the light source 66 and thus minimal heat generation due to extensive mechanical actuation. Furthermore, positioning latency by the actuation mechanism 70 is capable of being as good as or even better than that of magnetic disk drives.

In some arrangements and as shown in FIG. 2, the light sensor 68 is globe-shaped and surrounds the storage medium 54 thus alleviating the need for a moving sensor. In these arrangements, as light passes through the storage medium 54, that light is detected by a portion of the light sensor 68 immediately adjacent to the storage medium 54. Nevertheless, there is nothing that precludes the use of a smaller light sensor 68 which is moved to specific locations behind the storage medium 54 (e.g., by the actuation mechanism 70) for precise localized light sensing. Further details will now be provided with reference to FIG. 3.

Figure 3:
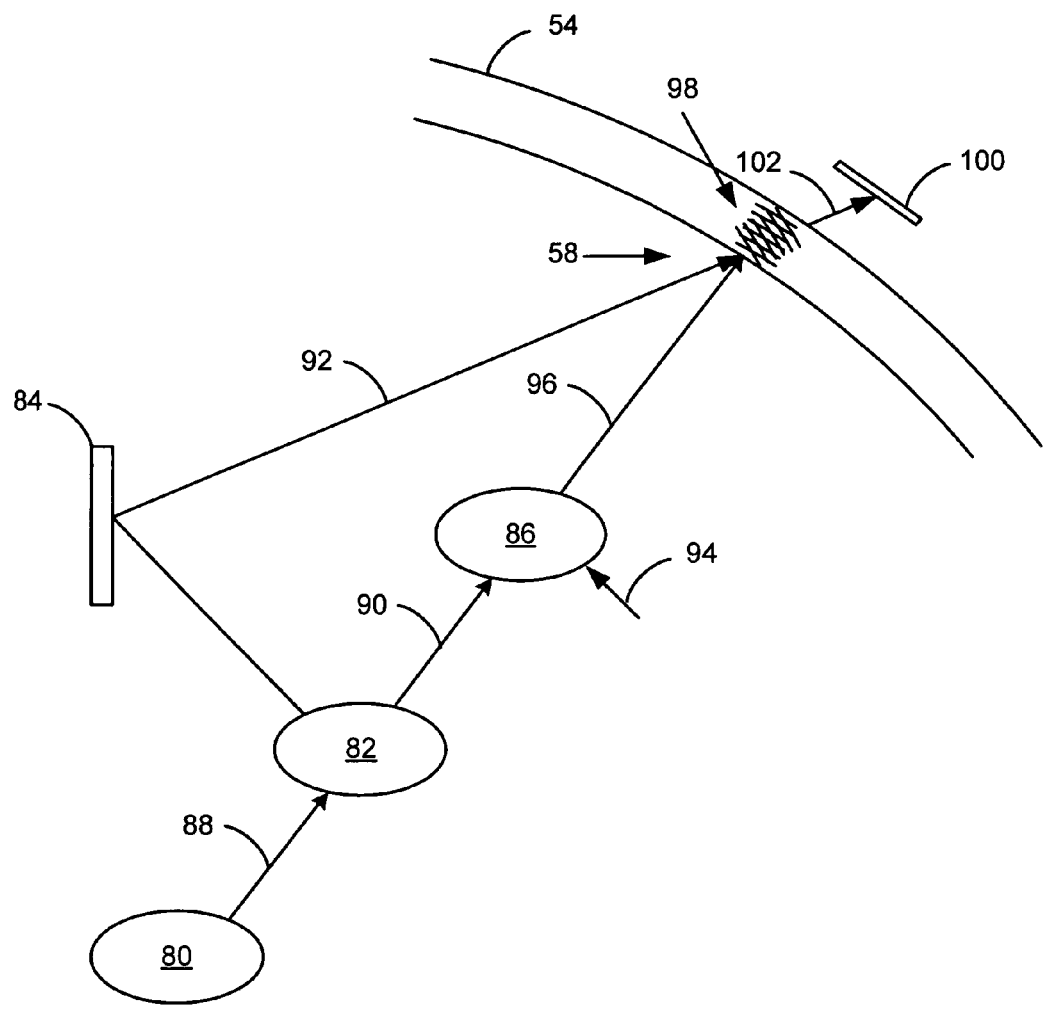
FIG. 3 is a sectional view of a portion of a sphere-shaped structure of the optical storage device of FIG. 2.

FIG. 3 is a general perspective view of a portion of the optical storage device 26 involved in data reading and data writing operations. The light source 66 includes a coherent laser source 80, a beam splitter 82, a director 84, and a spatial light modulator 86. The coherent laser source 80 is configured to provide a coherent light beam 88. The beam splitter 82 is configured to split the coherent light beam 88 into a signal beam 90 and a reference beam 92. The director 84 is configured to direct the reference beam 92 toward the curved surface 58 of the storage medium 54. The spatial light modulator (SLM) 86 is configured to encode data patterns 94 within the signal beam 90 and then output an encoded signal beam 96 (i.e., the original signal beam 90 which has been modified to include the encoded data patterns 94) toward the curved surface 58 of the storage medium 54. The intersection of the reference beam 92 and the encoded signal beam 96 at the curved surface 58 forms a holographic interference pattern 98 on the storage medium 54.

The light sensor 68 preferably includes a globe-shaped detector array 100 which is coupled to the base 50 and disposed in the external space 64 outside the storage medium 54 (also see FIG. 2). The detector array 100 is configured to detect the holographic interference pattern 98 formed on the storage medium 54 by sensing light 102 passing through the holographic interference pattern 98 at the curved surface 58 of the storage medium 54. As a result, the data patterns 94 are capable of being easily reconstructed.

Accordingly, during write operations, the director 84 directs the reference beam 92 and the SLM 86 aims the encoded signal beam 96 so that the reference beam 92 and the encoded signal beam 96 intersect at a targeted data storage location of the storage medium 54. At this targeted location, the intersecting beams 92, 96 form an interference pattern of bright and dark regions within the photosensitive recording material of the storage medium 54 thus forming, as the holographic image 98 within the storage medium 54, a multi-page digital data pattern.

Furthermore, during read operations, light from one beam (e.g., the reference beam 92 from the director 88) passes through the holographic image 96 at the targeted location. As the light passes through the holographic image 98, the globe-shaped detector array 100 of the light sensor 68 receives the light and reconstructs the data pattern. Further details of the optical storage system 20 will now be provided with reference to FIG. 4.

Figure 4:
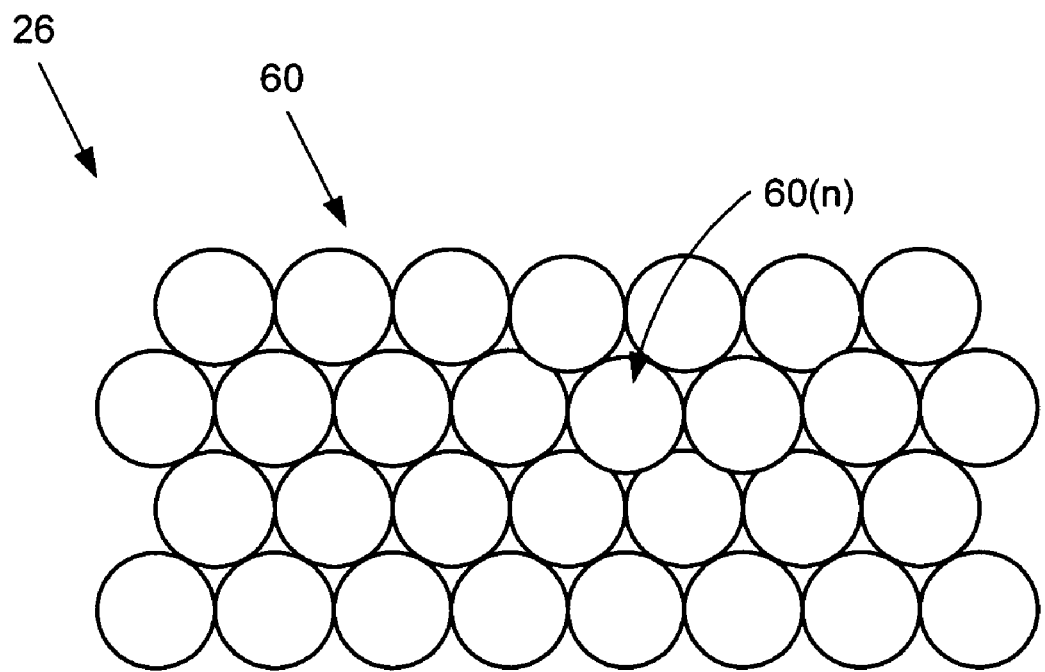
FIG. 4 is a top view of an arrangement of the optical storage devices of the optical storage system of FIG. 1.

FIG. 4 is a top view of a particular arrangement for the optical storage devices 26 which is well-suited for high density storage. The optical storage devices 26 are positioned to form a honey-comb arrangement where the sphere-shaped storage media structure 60 of each internally positioned device 26 (e.g., the structure 60(n) in FIG. 4) derives a degree of structural support from six neighboring sphere-shaped structures 60. Such physical reinforcement results in structural hardening which prevents denting and inhibits displacement of individual optical storage devices 26 from the horizontal two-dimensional layout (e.g., also see FIG. 1) when the optical storage devices are exposed to vibration (e.g., due to fan vibration, jostling from movement of the drawer 30, etc.).

It should be understood that different depths of the honey-comb arrangement are suitable. For example, at least 72 2.5 inch diameter optical storage devices 26 easily fit within a drawer 30 configured for a standard 17" rack with a drawer depth of 30".

It should be further understood that other arrangements are suitable for use as well as such rows and columns for the devices 26, triangular configurations, and so on. Such modifications and enhancements are intended to belong to various alternative embodiments of the system 20. Further details will now be provided with reference to FIG. 5.

Figure 5:
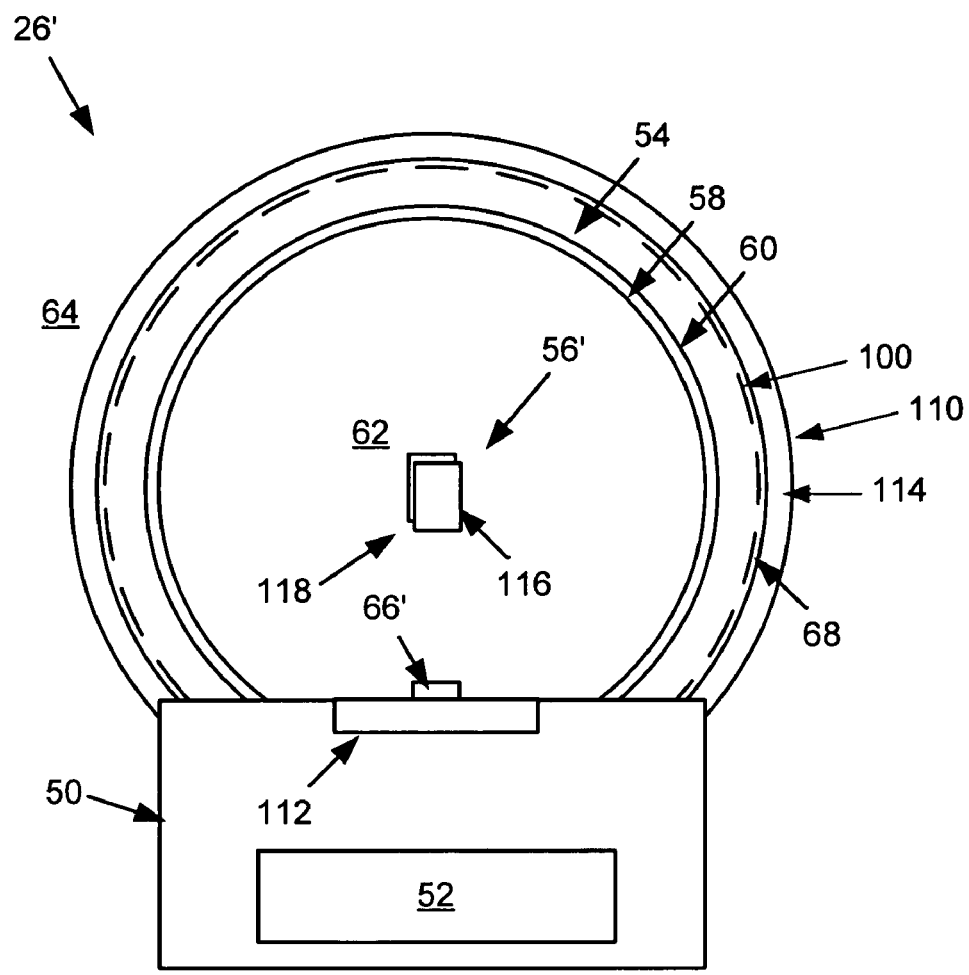
FIG. 5 is a sectional view of an alternative optical storage device which utilizes a mirror and magnetic field generator to control data access.

FIG. 5 is a sectional view of an optical storage device 26' in accordance with a second embodiment. The optical storage device 26' is similar to the earlier-described optical storage device 26, i.e., the first embodiment which is illustrated in FIG. 2. However, in contrast to the optical storage assembly 26, the optical storage device 26' utilizes an optical assembly 56' which utilizes a magnetic field to control access to the various data storage locations on the storage medium 54. Along these lines, the optical assembly 56' includes a magnetic field generator 110 having a magnet 112 disposed in base 50 and a magnetic field casing 114 disposed in the external space 64 and around the exterior of the storage medium 54. The optical assembly 56' further includes a set of mirrors 116 (i.e., one or more mirrors 116) disposed within the internal space 62. The magnetic field generator 110 is configured to levitate and orient the set of mirrors 116 at a location 118 which is substantially central to the internal space 62.

Initially, the set of mirrors 116 can reside in a locked down position over the magnet 112. However, once the optical storage device 26' begins operation, the magnetic field generator 110 raises the set of mirrors 116 above the base 50. In particular, since the casing 114 of the magnetic field generator 110 extends around the periphery of the storage medium 54, the magnetic field generator 110 is capable of levitating and orienting the set of mirrors 116 in the middle of the internal space 62. In this central location, the set of mirrors 116 is configured to adjust angular orientation in response to changes in a magnetic field and thus redirect light from a light source 66' toward targeted curved surfaces 58 of the storage medium 54 to form the holographic images 98 on the storage medium 58 (also see FIG. 3).

In some arrangements, the set of mirrors 116 is configured to steer both the encoded signal beam 96 and the reference beam 92 toward the data storage locations of the storage medium 54 (see FIG. 3). In these arrangements, the magnetic field generator 110 is configured to suspend multiple mirrors 116 centrally within the internal space 62, and control the angular orientations of the mirrors 116. In particular, magnetic field generator 110 steers the mirrors 116 in tandem so that both beams 92, 96 accurately direct the beams 92, 96 to the targeted storage location.

In other arrangements, the set of mirrors 116 is configured to steer only one of the beam 96/92 toward the data storage locations of the storage medium 54 with the other beam 96/92 being steered by other means. In one arrangement, a single mirror 116 steers the reference beam 92 from the director 88 (see FIG. 3) to the targeted location while the SLM 86 steers the encoded signal beam 96 to the targeted location. In another arrangement, a single mirror 116 directs the encoded signal beam 96 from the SLM 86 to the targeted location while the director 88 steers the reference beam 92 to the targeted location.

During write operations, the reference beam 92 and the encoded signal beam 96 intersect at a particular data storage location of the storage medium 54 (also see FIG. 3). At this location, the intersecting beams 92/96 form an interference pattern of bright and dark regions within the photosensitive recording material of the storage medium 54 thus generating, as a holographic image 98 within the storage medium 54, a multi-page digital data pattern.

During read operations, light from one beam (e.g., the reference beam 92 reflecting off a magnetic field controlled mirror 116) passes through the holographic image 96. As the light passes, the globe-shaped detector array 100 of the light sensor 68 receives the light and reconstructs the data pattern.

In the configuration shown in FIG. 5, it should be understood there are minimal moving parts and thus minimal friction. Accordingly, there is little or no heat generated by the movement of the set of mirrors 116. As a result, there is less demand for an air stream thus reducing costs for fans and supporting power supplies. Moreover, the lack of mechanical wear results in extended lifetimes and longer mean times between failures.

As described above, improved data storage techniques involve the use of a storage medium 54 having a curved surface 58 and an optical assembly 56, 56' configured to optically write data to and read data from the curved surface 58 of the storage medium 54. The use of such a storage medium 54 and optical assembly 56, 56' minimizes the need for extensive travel of the optical assembly 56, 56'. Rather, data access operations can be effectuated by simply orienting the optical assembly 56, 56' from a location which is substantially central to an internal space 62 defined by the curved surface 58 of the storage medium 54. Such orientation can occur with minimal latency and travel (e.g., control of angular direction). As a result, data access times are optimized, and mechanical movement and the associated heat generation are kept to a minimum.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the optical storage devices 26 (FIG. 2) were described above in the context of a high-density optical storage system 20 (FIG. 1) by way of example only. There are other arrangements which are suitable for use by the optical storage devices 26 as well. For instance, in some arrangements, the optical storage devices 26 are configured as stand-alone, portable storage devices. In such arrangements, a controller (e.g., see the controller 38 in FIG. 1) resides in the base 50, and the storage medium 54 has a BuckyBall-like hardened exterior which enables such an optical storage device 26 to be placed on a desktop and connected to a laptop or desktop computer. The controller provides access to a bootable operating system, user programs, and user files. Accordingly, a user does not need to travel with a laptop. Rather, the user simply travels with the optical storage device 26 and connects to a processing station upon arrival. Such modifications and enhancements are intended to belong to various embodiments of the invention.

What is claimed is:

1. An optical storage device, comprising:
    a base;
    a storage medium including a sphere-shaped structure supported on the base in a non-rotating position, the sphere-shaped structure separating an internal space from an external space of the storage medium, and a curved surface configured to store data in a digital manner as holographic images; and
    an optical assembly coupled to the base, at least a portion of the optical assembly being disposed within the internal space, the optical assembly being configured to optically write the data to and read the data from the curved surface of the storage medium and including an actuator mechanism having a first end attached to the base and a second end disposed within the internal space, a light source supported by the second end of the actuator mechanism within the internal space; and
    wherein the actuator mechanism selectively moves and aims the light source toward a predetermined location on the curved surface of the storage medium as the sphere-shaped structure remains in the non-rotating position;
    wherein the light source provides light during data writing and data reading operations to aid in the formation of a holographic image on the storage medium; and
    wherein the sphere-shaped structure is constructed and arranged to abut adjacent sphere-shaped structures of storage media of multiple adjacent optical storage devices disposed in a high density formation of optical storage devices.

2. An optical storage device as recited in claim 1 wherein the optical assembly includes:
    a light sensor disposed within the external space, the light sensor being configured to sense light from the light source which passes through the curved surface of the storage medium.

3. An optical storage device as recited in claim 2 wherein the light source includes:
    a coherent laser source configured to provide a coherent light beam;
    a beam splitter configured to split the coherent light beam into a signal beam and a reference beam;
    a director configured to direct the reference beam toward the curved surface of the storage medium; and
    a spatial light modulator configured to encode information within the signal beam and then output the signal beam toward the curved surface of the storage medium, the intersection of the reference beam and the signal beam at the curved surface of the storage medium forming the holographic image on the storage medium.

4. An optical storage device as recited in claim 3 wherein the light sensor includes a detector array which is (i) coupled to the base and (ii) disposed in the external space, the detector array being configured to detect the holographic image formed on the storage medium by sensing light passing through the curved surface of the storage medium.

5. An optical storage device as recited in claim 2 wherein the optical assembly further includes an actuator mechanism having a first end attached to the base and a second end disposed within the internal space;
    wherein the light source is attached to the second end of the actuator mechanism within the internal space; and
    wherein the actuator mechanism is configured to aim the light source toward the curved surface of the storage medium to form the holographic image on the storage medium.

6. An optical storage device as recited in claim 2 wherein the light source is attached to the base;
    wherein the optical assembly further includes a magnetic field generator disposed at least partially in the external space, and a mirror disposed within the internal space;
    wherein the magnetic field generator is configured to levitate and orient the mirror at a location which is substantially central to the internal space; and
    wherein the mirror is configured to redirect light from the light source toward the curved surface of the storage medium to form the holographic image on the storage medium.

7. An optical storage device as recited in claim 2 wherein the storage medium includes photosensitive recording material which is configured to store the holographic images as digital data pages in response to the light from the light source.

8. An optical storage device as recited in claim 7 wherein the light sensor is configured to read the holographic images as light from the light source passes through the photosensitive recording material.

9. An optical storage device as recited in claim 2 wherein the base includes a wireless interface coupled to the light source and the light sensor to enable data exchange between the optical assembly and an external circuit.

10. The optical storage device of claim 1 wherein the sphere-shaped structure, when abutting the adjacent sphere-shaped structures, contacts six adjacent sphere-shaped structures, the sphere-shaped structure being hollow to contain the light source of the optical assembly within the internal space to write and read data which is stored on the curved surface in a non-transitory manner.

11. An optical storage system, comprising:
a frame;
an environmental assembly supported by the frame; and
a set of optical storage devices coupled to the environmental assembly, each optical storage device including:
a base configured to connect to and disconnect from the environmental assembly,
a storage medium disposed on the base, the storage medium having a sphere-shaped structure including a curved surface configured to store data in a digital manner as holographic images, and
an optical assembly coupled to the base, the optical assembly being configured to optically write the data to and read the data from the curved surface of the storage medium; and
wherein the sphere-shaped structure of each optical storage device abuts adjacent sphere-shaped structures of storage media of multiple adjacent optical storage devices in a high density formation having a horizontal two-dimensional layout.

12. An optical storage system as recited in claim 11 wherein the storage medium of each optical storage device includes a sphere-shaped structure which defines an internal space and an external space, the internal space being separated from the external space by the sphere-shaped structure; and
wherein at least a portion of the optical assembly of each optical storage device is disposed within the internal space defined by the sphere-shaped structure of that optical storage device.

13. An optical storage system as recited in claim 12 wherein, for each optical storage device, the optical assembly includes:
a light source disposed within the internal space defined by the sphere-shaped structure of that optical storage device, the light source being configured to provide light during data writing and data reading operations performed on the curved surface of the storage medium of that optical storage device; and
a light sensor disposed within the external space defined by the sphere-shaped structure of that optical storage device, the light sensor being configured to sense light from the light source which passes through the curved surface of the storage medium of that optical storage device.

14. An optical storage system as recited in claim 13 wherein, for each optical storage device, the light source includes:
a coherent laser source configured to provide a coherent light beam;
a beam splitter configured to split the coherent light beam into a signal beam and a reference beam;
a director configured to direct the reference beam toward the curved surface of the storage medium; and
a spatial light modulator configured to encode information within the signal beam and then output the signal beam toward the curved surface of the storage medium of that optical storage device, the intersection of the reference beam and the signal beam at the curved surface of the storage medium of that optical storage device forming a holographic image.

15. An optical storage system as recited in claim 13 wherein, for each optical storage device, the storage medium includes photosensitive recording material which is configured to store the holographic images as digital data pages in response to the light from the light source of the optical assembly of that optical storage device.

16. An optical storage system as recited in claim 15 wherein, for each optical storage device, the light sensor of the optical assembly of that optical storage device is configured to read the holographic images as light from that light source passes through the photosensitive recording material of the storage medium of that optical storage device.

17. An optical storage system as recited in claim 13 wherein, for each optical storage device, the base includes a wireless interface coupled to the light source and the light sensor of the optical assembly of that optical storage device to enable data exchange between that optical assembly and an external circuit.

18. An optical storage system as recited in claim 12 wherein the frame includes a rack-mountable drawer configured to hold multiple optical storage devices so that adjacent spheres are in contact with each other in order to form the high density formation having a horizontal two-dimensional layout.

19. An optical storage system as recited in claim 18 wherein the rack-mountable drawer is configured to hold the optical storage devices in a honey-comb arrangement to provide structural hardening that inhibits displacement of individual optical storage devices from the horizontal two-dimensional layout when the optical storage devices are exposed to vibration.

20. The optical storage system as recited in claim 11, wherein the optical storage medium is supported on the base in a non-rotating position.

21. The optical storage system of claim 11 wherein a particular sphere-shaped structure of a particular storage medium, when abutting adjacent sphere-shaped structures, contacts six adjacent sphere-shaped structures, the particular sphere-shaped structure being hollow to contain a light source of the optical assembly of the particular storage medium within an internal space to write and read data which is stored on a curved surface of the particular storage medium in a non-transitory manner.

* * * * *